(12) United States Patent
Tsai et al.

(10) Patent No.: US 12,465,370 B2
(45) Date of Patent: Nov. 11, 2025

(54) SURGICAL INSTRUMENT

(71) Applicant: METAL INDUSTRIES RESEARCH & DEVELOPMENT CENTRE, Kaohsiung (TW)

(72) Inventors: Tung-Lin Tsai, Tainan (TW); Chun-Chieh Tseng, Kaohsiung (TW); Chun-Ming Chen, Kaohsiung (TW); Yue-Jun Wang, New Taipei (TW); Pei-Hua Wang, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 513 days.

(21) Appl. No.: 17/991,902

(22) Filed: Nov. 22, 2022

(65) Prior Publication Data

US 2024/0164795 A1     May 23, 2024

(51) Int. Cl.
*A61B 17/16* (2006.01)

(52) U.S. Cl.
CPC ...... *A61B 17/1615* (2013.01); *A61B 17/1624* (2013.01); *A61B 17/1633* (2013.01)

(58) Field of Classification Search
CPC . A61B 17/16; A61B 17/1615; A61B 17/1617; A61B 17/1633; A61B 17/17; A61B 17/1728; A61B 17/1732
See application file for complete search history.

(56) References Cited

U.S. PATENT DOCUMENTS

| | | | | |
|---|---|---|---|---|
| 4,039,266 A | * | 8/1977 | O'Connell | B23B 49/005 408/202 |
| 4,710,075 A | * | 12/1987 | Davison | A61B 17/16 408/202 |
| 5,507,801 A | * | 4/1996 | Gisin | B25H 1/0078 606/86 R |
| 5,772,661 A | | 6/1998 | Michelson | |
| 5,951,561 A | * | 9/1999 | Pepper | A61B 17/1717 606/86 R |
| 5,954,671 A | | 9/1999 | O'Neill | |
| 6,162,226 A | * | 12/2000 | DeCarlo, Jr. | A61B 17/164 408/202 |

(Continued)

FOREIGN PATENT DOCUMENTS

| | | | | |
|---|---|---|---|---|
| CA | 3149643 A1 | * | 2/2021 | A61C 5/44 |
| JP | H06105852 A | | 4/1994 | |

(Continued)

*Primary Examiner* — Eric S Gibson
(74) *Attorney, Agent, or Firm* — WPAT, PC

(57) ABSTRACT

A surgical instrument includes a rod and a push portion. The push portion includes a first end connected to an end of the rod and a second end having a blade portion. The push portion includes a plurality of grooves. The plurality of grooves is recessed in a surface of the push portion and is spaced from each other. Each two adjacent grooves has a rib formed therebetween. A top face of a cross section of each rib is the surface of the push portion. Each rib has a guiding face on the cross section of the push portion. The guiding face is connected to the surface of the push portion. The guiding face faces a rotating direction of the rod. An angle between the guiding face and the surface of the push portion in the cross section is greater than 90°.

13 Claims, 10 Drawing Sheets

(56) References Cited

U.S. PATENT DOCUMENTS

| | | | |
|---|---|---|---|
| 7,033,363 B2 * | 4/2006 | Powell | A61B 17/1728 606/104 |
| 7,141,074 B2 * | 11/2006 | Fanger | A61B 17/1757 606/80 |
| 7,207,991 B2 | 4/2007 | Michelson | |
| 7,276,082 B2 | 10/2007 | Zdeblick et al. | |
| 7,794,465 B2 | 9/2010 | Marik et al. | |
| 8,870,889 B2 | 10/2014 | Frey | |
| 8,876,444 B1 * | 11/2014 | Chanturidze | B23B 51/104 408/202 |
| 8,911,445 B2 * | 12/2014 | Rocci | A61B 17/1739 606/86 R |
| 8,936,600 B2 * | 1/2015 | Soliman | A61B 17/1728 606/104 |
| 8,974,466 B2 | 3/2015 | Powell | |
| 9,480,488 B2 | 11/2016 | Powell | |
| 9,827,010 B2 | 11/2017 | Vad et al. | |
| 10,470,805 B2 | 11/2019 | Biedermann et al. | |
| 11,076,895 B2 | 8/2021 | Biedermann et al. | |
| 11,389,196 B2 | 7/2022 | Vad et al. | |
| 11,529,147 B2 * | 12/2022 | Frey | A61B 17/17 |
| 11,759,236 B2 | 9/2023 | Vad et al. | |
| 11,771,478 B2 | 10/2023 | Biedermann et al. | |
| 2009/0234396 A1 * | 9/2009 | Medoff | A61F 2/4601 606/86 R |
| 2009/0318927 A1 * | 12/2009 | Martin | A61B 17/1764 606/96 |
| 2014/0276880 A1 * | 9/2014 | Li | A61B 17/17 606/96 |
| 2018/0161124 A1 * | 6/2018 | Huwais | B23B 49/005 |
| 2018/0317962 A1 | 11/2018 | Vad et al. | |
| 2021/0045754 A1 * | 2/2021 | Khosla | A61B 17/1633 |
| 2022/0313278 A1 * | 10/2022 | Marshall | A61C 5/44 |
| 2024/0164795 A1 * | 5/2024 | Tsai | A61B 17/1615 |

FOREIGN PATENT DOCUMENTS

| | | | | |
|---|---|---|---|---|
| JP | 2006187633 A | 7/2006 | | |
| JP | 2013154438 A | 8/2013 | | |
| WO | WO-2005065377 A2 * | 7/2005 | | A61B 17/1615 |
| WO | WO-2021030317 A1 * | 2/2021 | | A61C 5/44 |

* cited by examiner

SURGICAL INSTRUMENT

BACKGROUND OF THE INVENTION

1. Field of the Invention

The present invention relates to a surgical instrument and, more particularly, to a surgical instrument used in an operation of drilling a hole in a bone.

2. Description of the Related Art

In the therapy of a bone damaged by external forces, diseases, or degradation, a bone nail can be implanted into the damaged bone to increase the bone strength or to fix the bone for the purposes of easy healing. Generally, before the bone nail is implanted, the bone is conventionally cut by a blade portion of a drill to drill an implantation hole for the bone nail. However, the bone is apt to be damaged after cutting the bone, causing loss of bone mass, which requires an additional bone substitution operation. Furthermore, bone damage tends to cause osteonecrosis which impedes the postoperative growth of the bone, thereby increasing the surgical risk and the operational costs.

Thus, improvement to the conventional surgical instrument is necessary.

SUMMARY OF THE INVENTION

To solve the above drawbacks, an objective of the present invention is to provide a surgical instrument which can reduce bone damage.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

As used herein, the term "a" or "an" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling", "engagement", "assembly", or similar terms is used to include separation of connected members without destroying the members after connection or inseparable connection of the members after connection. A person having ordinary skill in the art would be able to select according to desired demands in the material or assembly of the members to be connected.

A surgical instrument according to the present invention comprises a rod and a push portion. The rod includes two ends and an axis passing through the two ends. The axis is a rotating axis of the rod. The push portion has a first end connected to one of the two ends of the rod. The push portion includes a second end having a blade portion. The push portion includes a plurality of grooves. The plurality of grooves is recessed in a surface of the push portion. The plurality of grooves is spaced from each other. Each two adjacent grooves have a rib formed therebetween. A top face of a cross section of each rib is the surface of the push portion. Each rib has a guiding face on the cross section of the push portion. The guiding face is connected to the surface of the push portion. The guiding face faces a rotating direction. An angle between the guiding face and the surface of the push portion in the cross section is greater than 90°.

Thus, when a worker proceeds with a bone drilling operation, a push portion with a surface of a predetermined outer diameter may be selected. The blade portion of the second end of the push portion is placed to be in contact with a predetermined location of a surface of a bone, and the rod is driven to rotate in the rotating direction. The blade portion of the second end can cut the bone while drilling into the bone. At this time, the bone scraps generated during cutting operation of the blade portion of the second end can enter the grooves. Furthermore, the bone scraps can be pushed along the guiding faces towards the inner wall of the bone, such that the surface can be pushed towards the inner wall of the bone and can press against the inner wall of the bone. Therefore, the blade portion of the second end can drill deeper while the surface of the push portion presses against the inner wall of the bone, such that the bone scraps and the inner wall of the bone together form a dense layer, forming a tough bone. Furthermore, the worker can use a plurality of push portions with different outer diameters to gradually ream the hole by using the push portions according to the increasing sequence of the diameter. The staged reaming can reduce the risk of osteonecrosis.

In an example, each of the plurality of grooves extends in a direction which is at an angle of 1°-45° to the axis. Thus, the bone scraps entering the grooves can be pushed to move towards an inner wall of a bone and to move deeper.

In an example, the push portion has a diameter gradually decreases from the first end towards the second end. This assists the push portion in drilling into the bone and providing a reaming effect.

In an example, the surface of the tapering push portion is at an angle of 1°-16° to the axis. Thus, the hole drilling effect of the push portion can be enhanced.

In an example, the surgical instrument further comprises a limiting member coupled to an outer surface of the rod and axially slidable relative to the rod. The limiting member includes a positioning portion configured to position the limiting member in a predetermined location on the rod. Thus, a worker can place the limiting member near or abut the skin or the surface of the bone to know the drilling depth of the push portion.

In an example, the limiting member is an annular member. The positioning portion includes a bolt and a screw hole. The screw hole extends from an inner surface through an outer surface of the limiting member. The bolt engages with the screw hole and abuts the rod. Thus, the limiting member can be positioned on a predetermined location on the rod to set the predetermined drilling depth of the push portion into the bone.

In an example, the surgical instrument further comprises a socket. The socket includes an abutting end and an insertion end. The rod and the push portion are configured to be inserted into the insertion end. Thus, the socket can be positioned in the predetermined drilling position and can form a passageway through which the rod is inserted, allowing the worker to easily drill a hole.

In an example, the abutting end includes an end edge having a plurality of abutting portions. The plurality of abutting portions is a plurality of protrusive teeth or a plurality of recessions. Thus, the abutting end can form a resistance in the rotating direction, which avoids rotational displacement of the socket during the surgery, thereby avoiding drilling errors.

In an example, the socket includes a disengagement prevention portion on an outer periphery thereof. The disengagement prevention portion is a plurality of annular portions protruding in a radial direction. Thus, the disengagement prevention portion can form a resistance to the socket in the axial direction to avoid disengagement of the socket from the tissue during the surgery, allowing a smooth hole-drilling operation.

In an example, the disengagement prevention portion includes a single-direction inclined surface. Thus, disengagement prevention portion can easily place the guiding member into the skin or a small opening for the minimally invasive operation. Furthermore, after operation, the worker can easily remove the guiding member out of the skin or the small opening for the minimally invasive operation.

In an example, the surgical instrument further comprises at least one guiding member. The at least one guiding member includes a connecting stem. At least one end of the connecting stem has a socket. Thus, the connecting stem can be easily held by the worker, enhancing the use convenience.

In an example, each of two ends of the connecting stem has the socket. The sockets on the two ends of the connecting stem have different inner diameters. Thus, the guiding member can be used with two rods of different outer diameters. This can reduce the number of surgical instruments to simplify the surgical process and to permit easy, smooth surgical process.

In an example, the at least one guiding member includes two guiding members. The inner diameter of one of the sockets on one of the two guiding members corresponds to or is slightly greater than an outer diameter of one of the sockets of another of the two guiding members. Thus, the socket of one of the guiding members can be placed into the socket of another guiding member, permitting use with two rods of different outer diameters, which permits easy, smooth staged reaming operation.

DETAILED DESCRIPTION OF THE INVENTION

Figure 1:
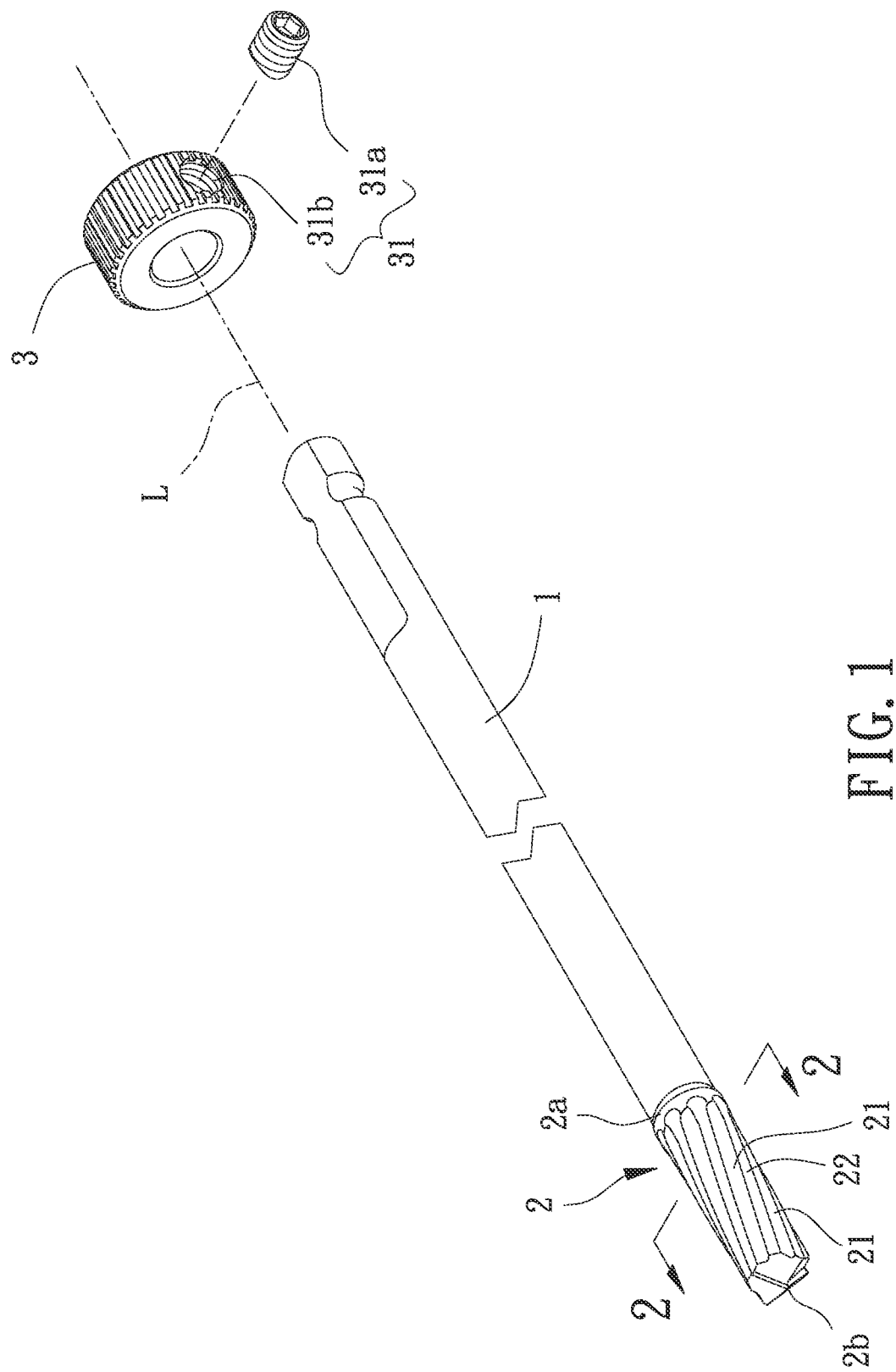
FIG. 1 is an exploded, perspective view of a surgical instrument of a first embodiment according to the present invention.

The present invention will become clearer in light of the following detailed description of illustrative embodiments of this invention described in connection with the drawings. Furthermore, the elements designated by the same reference numeral in various figures will be deemed as identical, and the description thereof will be omitted.

With reference to FIG. 1, a surgical instrument of a first embodiment according to the present invention comprises a rod 1 and a push portion 2. The push portion 2 is located on an end of the rod 1.

The rod 1 is made of a material with a certain rigidity to provide the rod 1 with a sufficient strength so as to be driven by a driving member to rotate. The rod 1 may be made of SUS420 medical grade stainless steel to avoid rejection or allergic reaction by the human tissue. The outer surface of the rod 1 may have a coating of chromium carbide to provide the rod 1 with enhanced anti-corrosion and anti-abrasion properties. The rod 1 includes an axis L passing through two ends of the rod 1. When the rod 1 is driven by the driving member, the rod 1 can rotate about the axis L.

Figure 3:
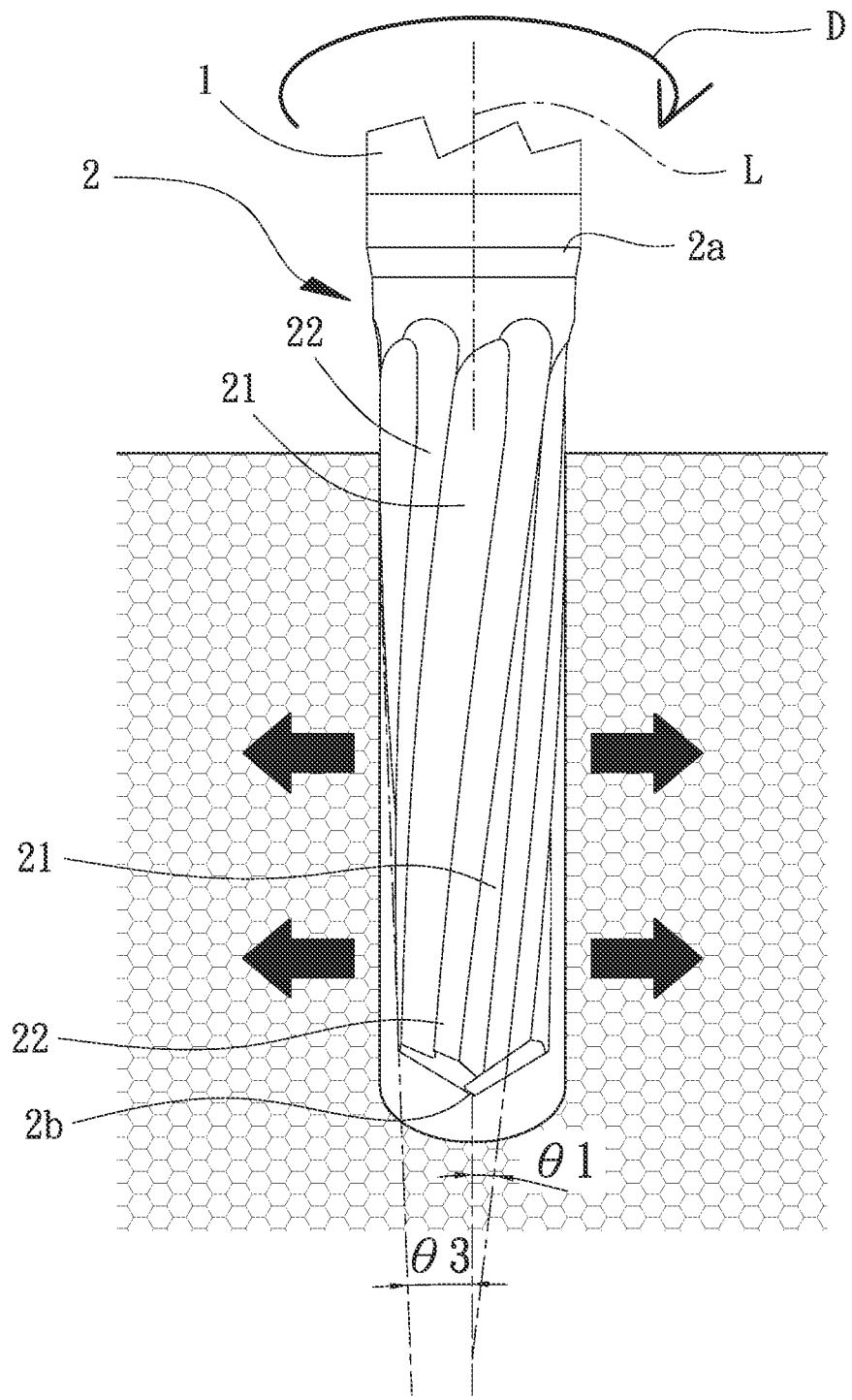
FIG. 3 is a diagrammatic view illustrating a hole drilling operation of the surgical instrument of the first embodiment according to the present invention.

With reference to FIGS. 1 and 3, the push portion 2 is connected to an end of the rod 1. The push portion 2 may be integrally formed with the rod 1. Alternatively, the push portion 2 may be detachably coupled to an end of the rod 1, such as by snap fit, locking, or threading connection, permitting easy replacement when the push portion 2 is worn out. The push portion 2 may also be made of SUS420 medical grade stainless steel. Alternatively, the outer surface of the rod 1 may also have a coating of chromium carbide. In this embodiment, the push portion 2 includes a first end 2a, a second end 2b, and a surface C. The first end 2a of the push portion 2 is connected to an end of the rod 1. The second end 2b of the push portion 2 is a blade portion configured to contact with a predetermined location of a surface of a bone. When the rod 1 rotates in a rotating direction D, the push portion 2 rotates jointly, and the blade portion of the second end 2b drills into the bone. Furthermore, the push portion 2 has a diameter gradually decreases from the first end 21a towards the second end 21b, such that the push portion 2 has a conicity. In another embodiment, the surface C of the tapering push portion 2 is at an angle θ3 of 1°-16° to the axis L, which assists the push portion 2 in drilling into the bone and assists in the reaming function.

Figure 2:
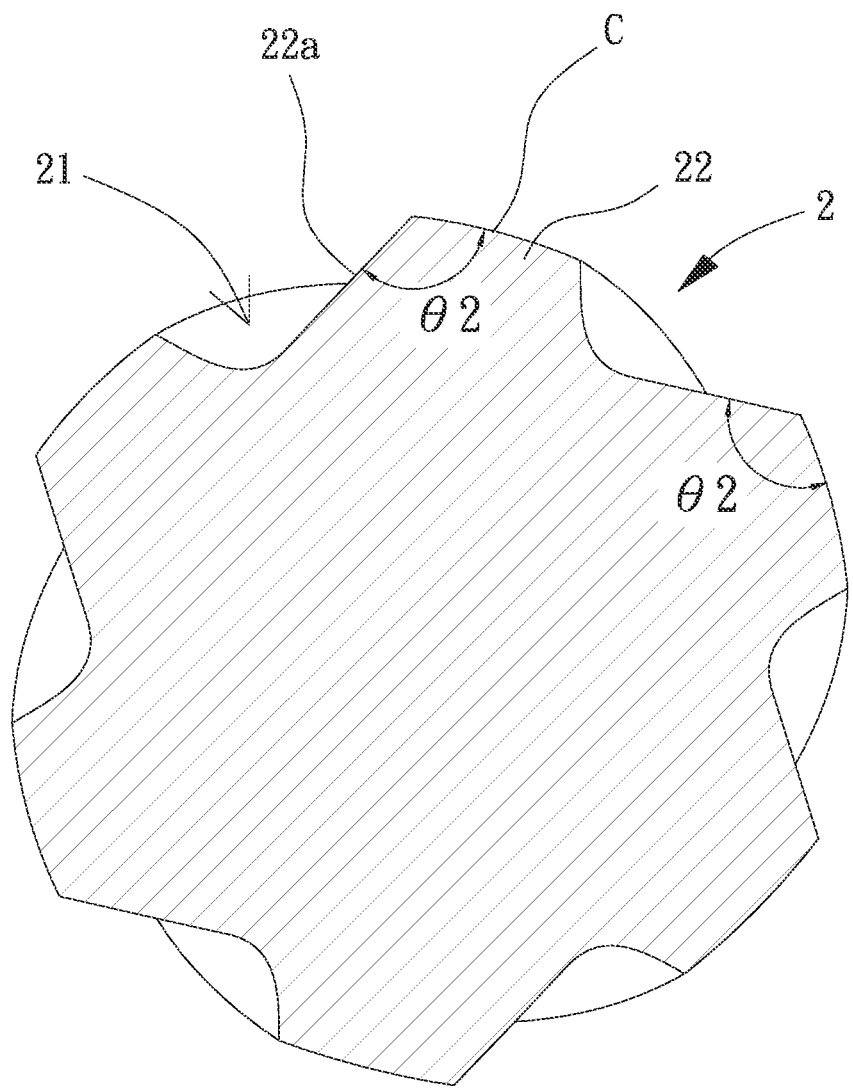
FIG. 2 is a cross sectional view taken along section line 2-2 of FIG. 1.

With reference to FIGS. 2 and 3, the push portion 2 includes a plurality of grooves 21 on the surface C of the push portion 2. The plurality of grooves 21 extends and is recessed between the first end 2a and the second end 2b. The plurality of grooves 21 is configured to receive bone scraps generated during cutting operation of the blade portion of the second end 2b. Each of the plurality of grooves 21 may be inclinedly disposed in the surface C of the push portion 2. Each of the plurality of grooves 21 extends in a direction which is at an angle θ1 to the axis L. The angle θ1 may be in a range of 1°-45°. Specifically, each two adjacent grooves 21 has a rib 22 formed therebetween, and a top face of a cross section of each rib 22 is the surface C of the push portion 2. After the push portion 2 drills into the bone, the surface C will not cut the inner wall of the bone and can be used to press against the inner wall of the bone, thereby reducing injury to the inner wall of the bone.

Each rib 22 has a guiding face 22a on the cross section of the push portion 2. The guiding face 22a is connected to the surface C of the push portion 2. The guiding face 22a faces the rotating direction D. When the push portion 2 rotates, the bone scraps generated during cutting operation of the blade portion of the second end 2b enter the plurality of grooves 21 and are guided by the guiding faces 22a to move towards the inner wall of the bone. Furthermore, an angle θ2 exists between the guiding face 22a and the surface C of the push portion 2 in the cross section. The angle θ2 is greater than 90°. Thus, an obtuse angle may be formed between the connection area between the guiding face 22a and the surface C of the push portion 2 to avoid cutting the inner wall of the bone, thereby reducing injury to the inner wall of the bone.

Still referring to FIG. 1, the rod 1 may be further coupled with a limiting member 3. The limiting member 3 is coupled to the outer surface of the rod 1 and is axially slidable relative to the rod 1. Furthermore, the limiting member 3 may include a positioning portion 31 configured to position the limiting member 3 in a predetermined location on the rod 1. In this embodiment, the limiting member 3 is an annular member disposed around the outer surface of the rod 1 and is axially slidable along the outer surface of the rod 1. The positioning portion 31 may be made of an elastically deformable material and is located on an annular inner face of the limiting member 3, such that the limiting member 3 can be press-fit on the outer surface of the rod 1. Alternatively, as shown in FIG. 1, the positioning portion 31 of the limiting member 3 includes a bolt 31a and a screw hole 31b. The screw hole 31b extends from an inner surface through an outer surface of the limiting member 3. The bolt 31a engages with the screw hole 31b and tightly abuts the rod 1. Thus, the limiting member 3 can be positioned on the rod 1 and has a predetermined distance to the push portion 2. The predetermined distance may be set as the predetermined depth drilling into the bone. The limiting member 3 gradually approaches the skin along with drilling of the rod 1. By this arrangement, a worker can know the drilling depth of the push portion 2.

With reference to FIG. 3, when a worker proceeds with a bone drilling operation, a push portion 2 with a surface C of a predetermined outer diameter may be selected. The blade portion of the second end 2b of the push portion 2 is placed to be in contact with a predetermined location of a surface of a bone, and the rod 1 is driven to rotate in the rotating direction D. The blade portion of the second end 2b can cut the bone while drilling into the bone. At this time, the bone scraps generated during cutting operation of the blade portion of the second end 2b can enter the grooves 21. Furthermore, the bone scraps can be pushed along the guiding faces 22a towards the inner wall of the bone, such that the surface C can be pushed towards the inner wall of the bone and can press against the inner wall of the bone. Therefore, the blade portion of the second end 2b can drill deeper while the surface C of the push portion presses against the inner wall of the bone, such that the bone scraps and the inner wall of the bone together form a dense layer, forming a tough bone. Furthermore, the worker can use a plurality of push portions 2 with different outer diameters to gradually ream the hole by using the push portions 2 according to the increasing sequence of the diameter. The staged reaming can reduce the risk of osteonecrosis.

Figure 4:
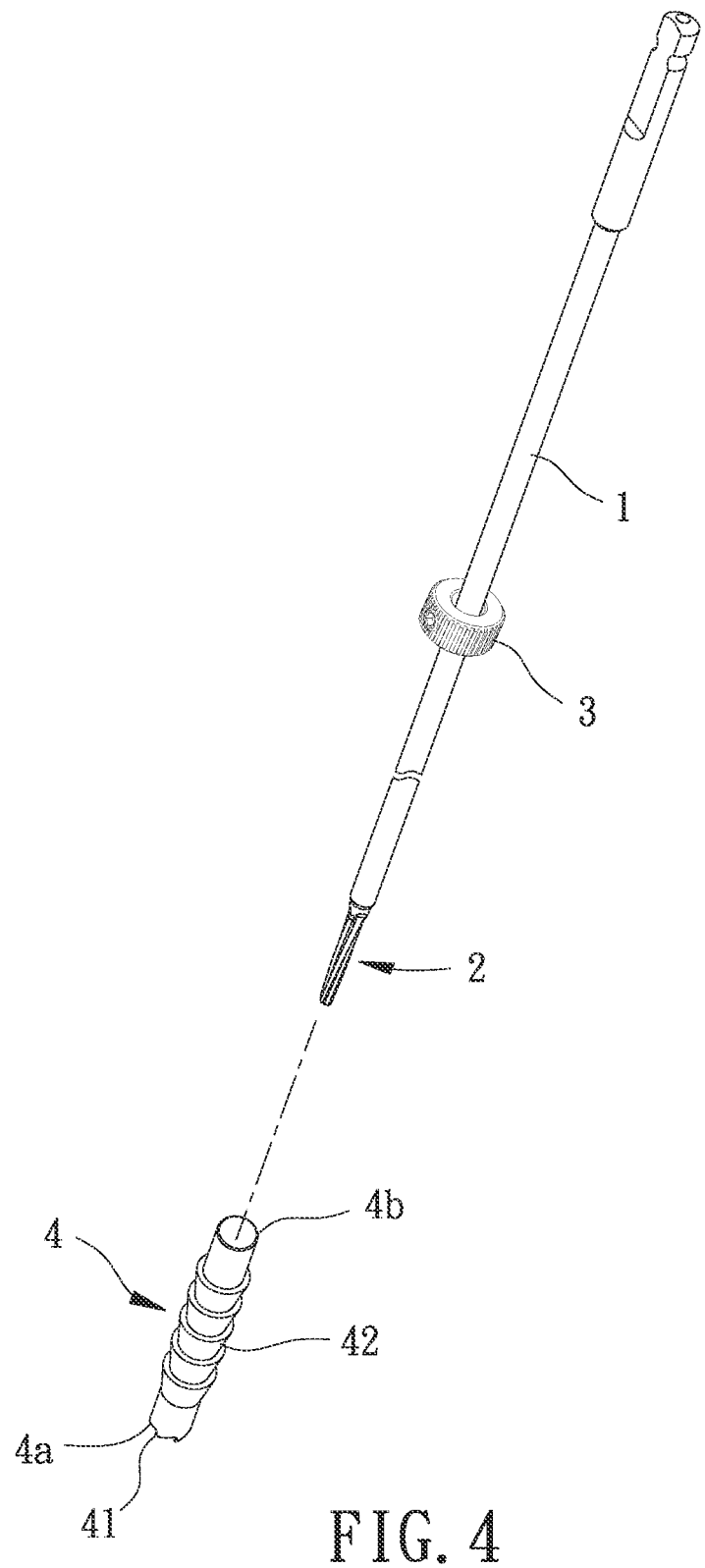
FIG. 4 is an exploded, perspective view of a surgical instrument of a second embodiment according to the present invention.
Figure 5:
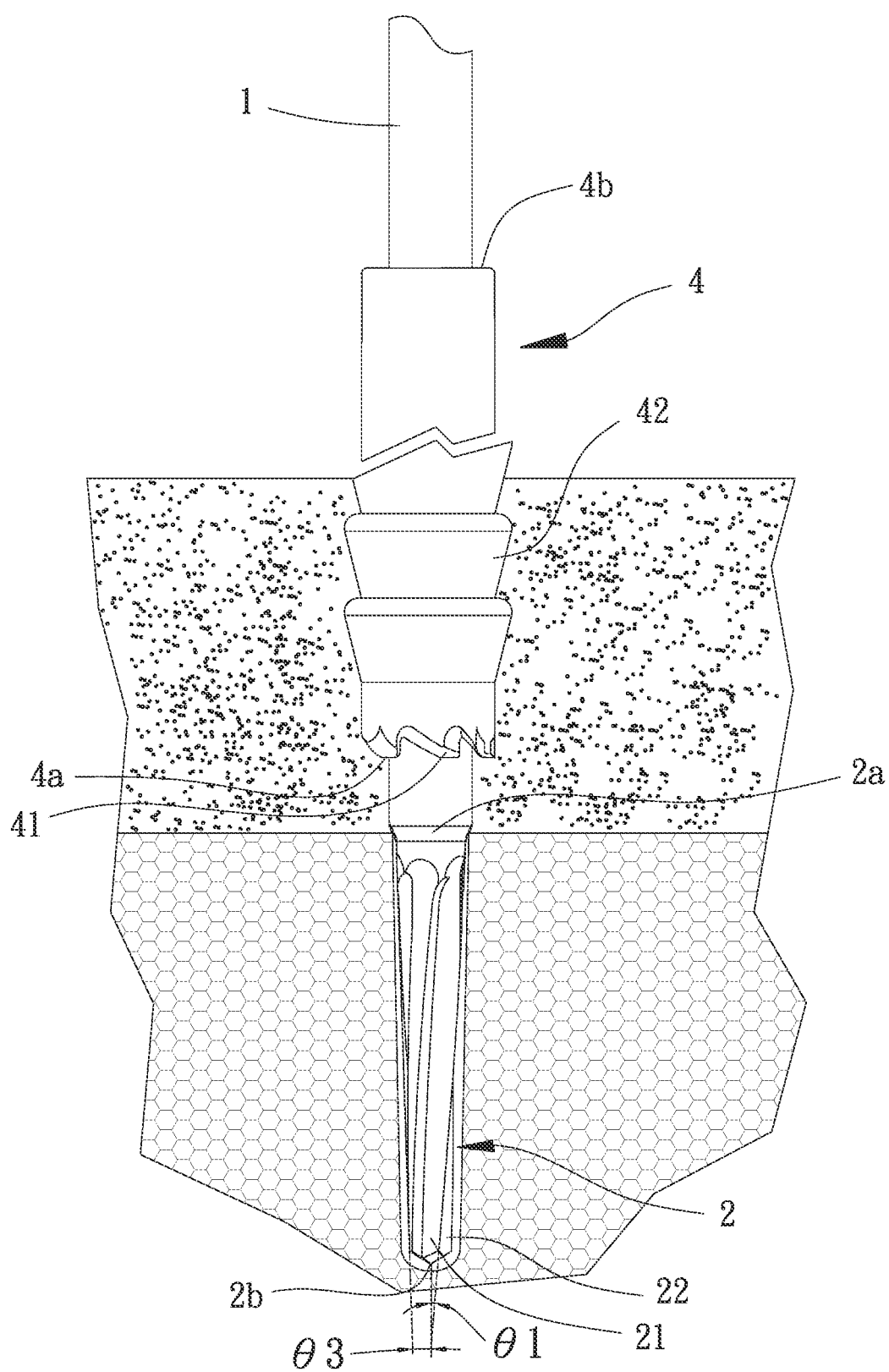
FIG. 5 is a diagrammatic view illustrating a hole drilling operation of the surgical instrument of the second embodiment according to the present invention.

Please refer to FIGS. 4 and 5 showing a surgical instrument of a second embodiment according to the present invention. In comparison with the first embodiment, this embodiment further comprises a socket 4. The inner diameter of the socket 4 may correspond to or be slightly greater than an outer diameter of the rod 1. The rod 1 and the push portion 2 can be inserted into the socket 4. Furthermore, the maximum outer diameter of the push portion 2 may be not greater than the outer diameter of the rod 1. Thus, the inner diameter of the socket 4 can only correspond to the outer diameter of the rod 1 to allow insertion of the rod 1 and the push portion 2, providing enhanced convenience in manufacturing.

The socket 4 includes an abutting end 4a and an insertion end 4b. The abutting end 4a can abut a predetermined drilling position on the surface of the bone. Alternatively, the abutting end 4a can abut against the muscle. The rod 1 and the push portion 2 can be inserted into the insertion end 4b to drill a hole towards the predetermined drilling position. For example, when proceeding with a minimally invasive surgery, the predetermined drilling position is covered by the skin or the muscle. Therefore, the socket 4 can be inserted into a small opening (for the minimally invasive surgery) pre-formed on the skin or the muscle, so as to be positioned in the predetermined drilling position while forming a passageway permitting insertion of the rod 1 and the push portion 2, thereby allowing the worker to conveniently drill a hole.

The abutting end 4a includes an end edge which may have a plurality of abutting portions 41. The plurality of abutting portions 41 may be a plurality of protrusive teeth or a plurality of recessions. Thus, the plurality of abutting portions 41 can form a resistance in the rotating direction, preventing the socket 4 from rotating during the surgery to thereby avoid drilling deviation. Alternatively, the socket 4 may include a disengagement prevention portion 42 on an outer periphery thereof. The disengagement prevention portion 42 may include a plurality of annular portions protruding in a radial direction. The disengagement prevention portion 42 may be a single-direction inclined surface, such that the disengagement prevention portion 42 can be easily placed into the skin or the small opening for the minimally invasive surgery and can form a small resistance in the axial direction to prevent the socket 4 from disengaging from the tissue during the surgery, thereby allowing smooth hole-drilling operation. Of course, since the skin or the small opening for the minimally invasive surgery can be expanded in the radial direction, the worker can easy remove the disengagement prevention portion 42 from the skin or the small opening for the minimally invasive surgery after the surgery is completed. The abutting portion 41 or the disengagement prevention portion 42 may be independently or jointly formed on the socket 4. The present invention is not limited in this regard.

Figure 6:
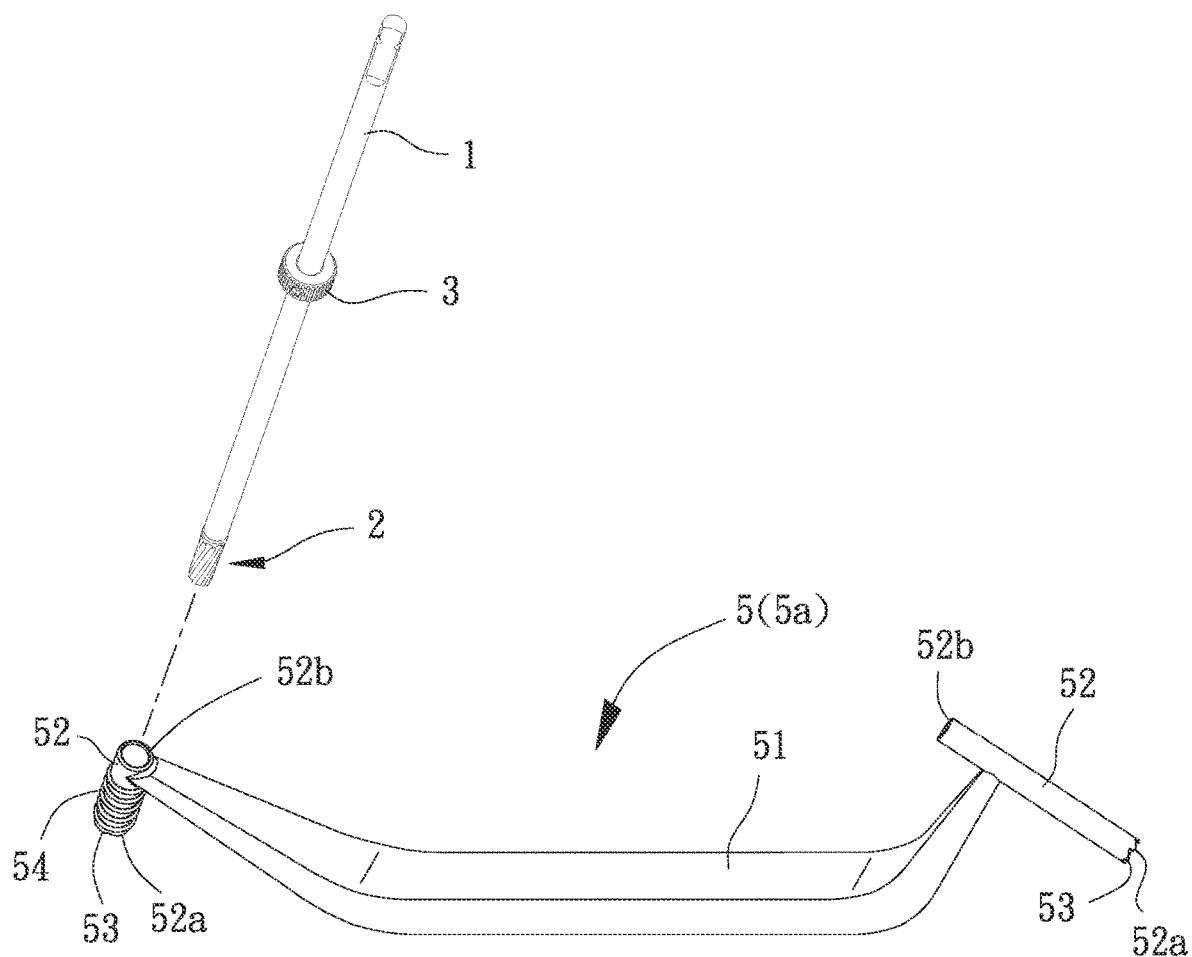
FIG. 6 is an exploded, perspective view of a surgical instrument of a third embodiment according to the present invention.

Please refer to FIG. 6 showing a surgical instrument of a third embodiment according to the present invention. In comparison with the first embodiment, this embodiment further comprises at least one guiding member 5 having a connecting stem 51. At least one end of the connecting stem 51 has a socket 52. Preferably, each of the two ends of the connecting stem 51 has a socket 52. As illustrated in the second embodiment, each socket 52 may include an abutting end 52a and an insertion end 52b. Each socket 52 may include an abutting portion 53 and/or a disengagement prevention portion 54, which are respectively the same with or similar to the above abutting portion 41 and/or the disengagement prevention portion 42. The rod 1 and the push portion 2 are configured to be inserted into the insertion end 52b to drill a hole towards a predetermined drilling position. It is worth noting that the sockets 52 on the two ends of the connecting stem 51 may have different inner diameters. Therefore, the guiding member 5 can be used with two rods 1 and two push portions 2 of different outer diameters. This can reduce the number of surgical instruments to simplify the surgical process, enhancing the use convenience.

Figure 7:
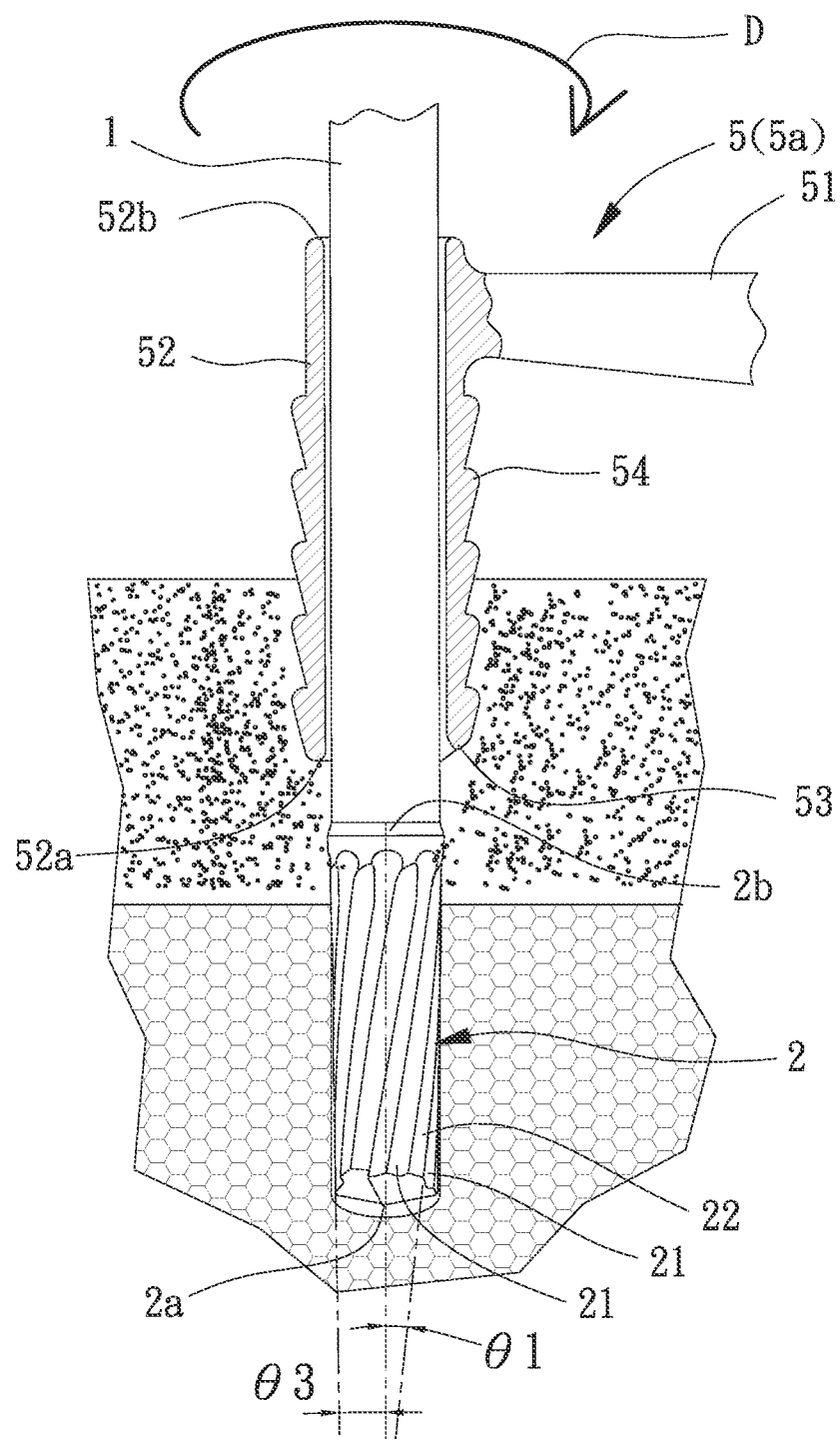
FIG. 7 is a diagrammatic cross sectional view of the surgical instrument of the third embodiment according to the present invention in use.

Please refer to FIG. 7 which is a cross sectional view of the surgical instrument of the third embodiment according to the present invention in use. The worker can hold the connecting stem 51 of the guiding member 5 with one hand and can abut the abutting end 52a of a socket 52 of the guiding member 5 on a predetermined drilling position on the surface of a bone. Alternatively, the abutting end 52a can abut a muscle. The push portion 2 having the surface C of a predetermined outer diameter is selected, and the rod 1 and the push portion 2 can be inserted via the insertion end 52b. The rod 1 is driven to rotate in the rotating direction D. The blade portion of the second end 2b can cut the bone and drill deeper. The scraps generated during the cutting operation of the blade portion enter the grooves 21 and are guided by the guiding faces 22a to move towards the inner wall of the bone. Therefore, the blade portion of the second end 2b can drill deeper while the surface C of the push portion presses against the inner wall of the bone, such that the bone scraps and the inner wall of the bone together form a dense layer, forming a tough bone.

Figure 8:
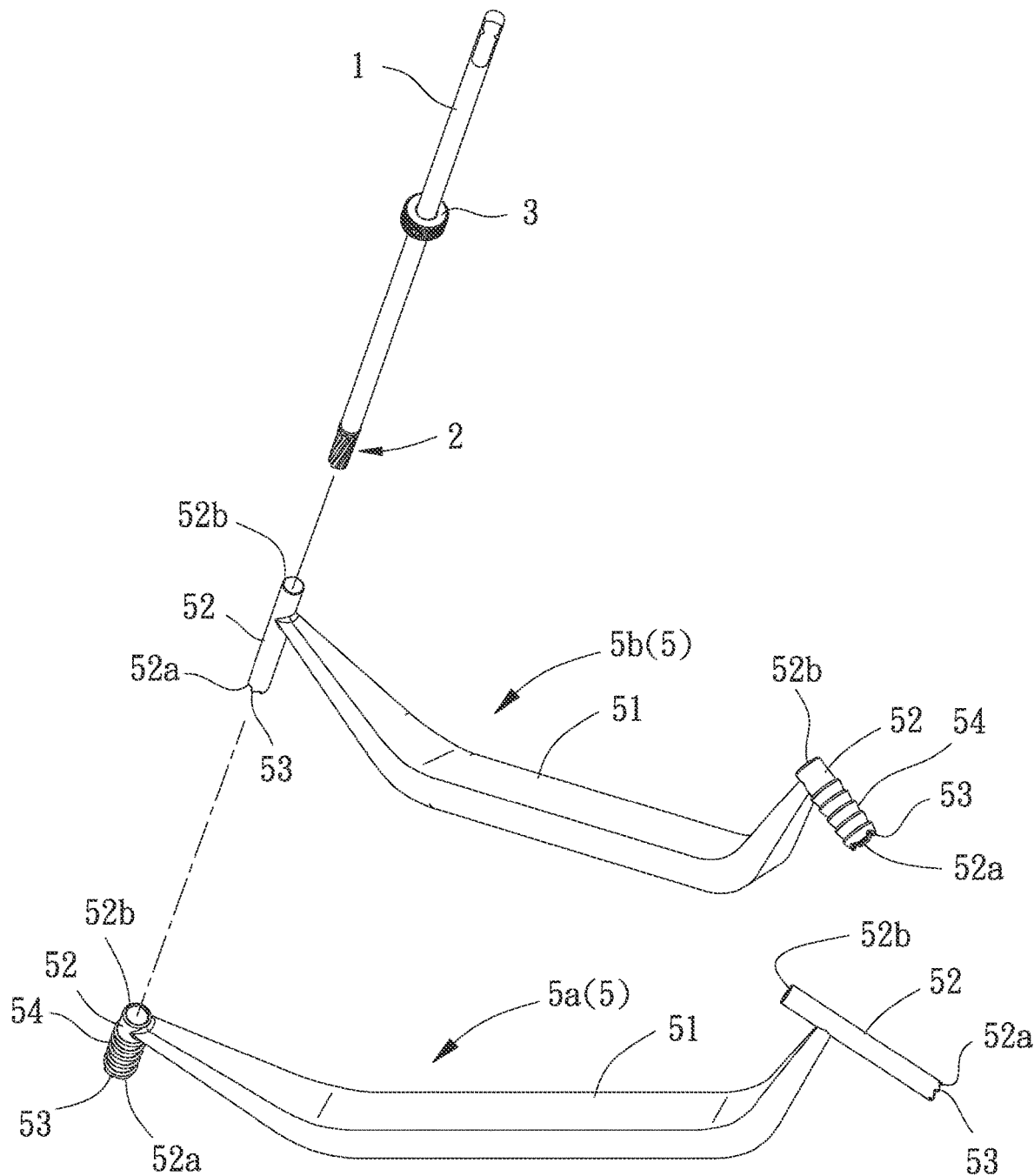
FIG. 8 is an exploded, perspective view of a surgical instrument of a fourth embodiment according to the present invention.

Please refer to FIG. 8 illustrating a surgical instrument of a fourth embodiment according to the present invention. In comparison with the third embodiment, this embodiment further comprises two guiding members 5a and 5b. The two guiding members 5a and 5b can be the same as those illustrated in the third embodiment. Alternatively, each of the two ends of the connecting stem 51 has a socket 52. Each socket 52 may include an abutting end 52a and an insertion end 52b. As illustrated in the third embodiment, each socket 52 may include the above abutting portion 53 and/or the above disengagement prevention portion 54. The rod 1 and the push portion 2 are configured to be inserted into the insertion end 52b to drill a hole towards a predetermined drilling position.

It is worth noting that the sockets 52 on the two ends of the connecting stem 51 of each of the two guiding members 5a and 5b may have different inner diameters. Therefore, the two guiding members 5a and 5b can be used with four rods 1 and four push portions 2 of different outer diameters. This can reduce the number of surgical instruments to simplify the surgical process, enhancing the use convenience. Furthermore, in another embodiment, the inner diameter of one of the sockets 52 may be slightly greater than an outer diameter of another socket 52. Thus, when the two guiding members 5a and 5b are used, the socket 52 of one of the two guiding members 5a, 5b can be disposed in the socket 52 of another of the two guiding members 5a, 5b to proceed with staged reaming operation.

Figure 9:
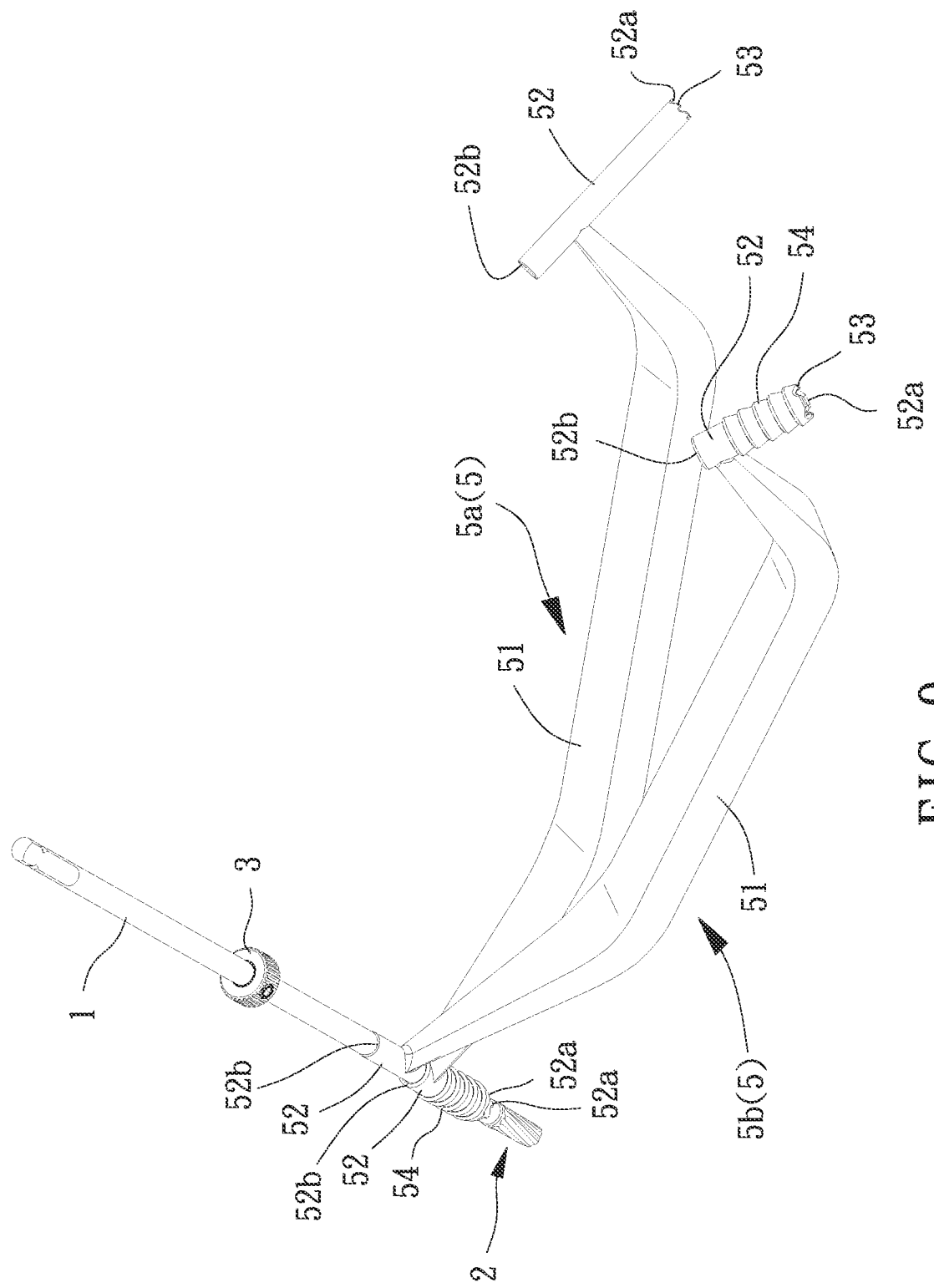
FIG. 9 is a perspective view of the surgical instrument of the fourth embodiment according to the present invention in use.
Figure 10:
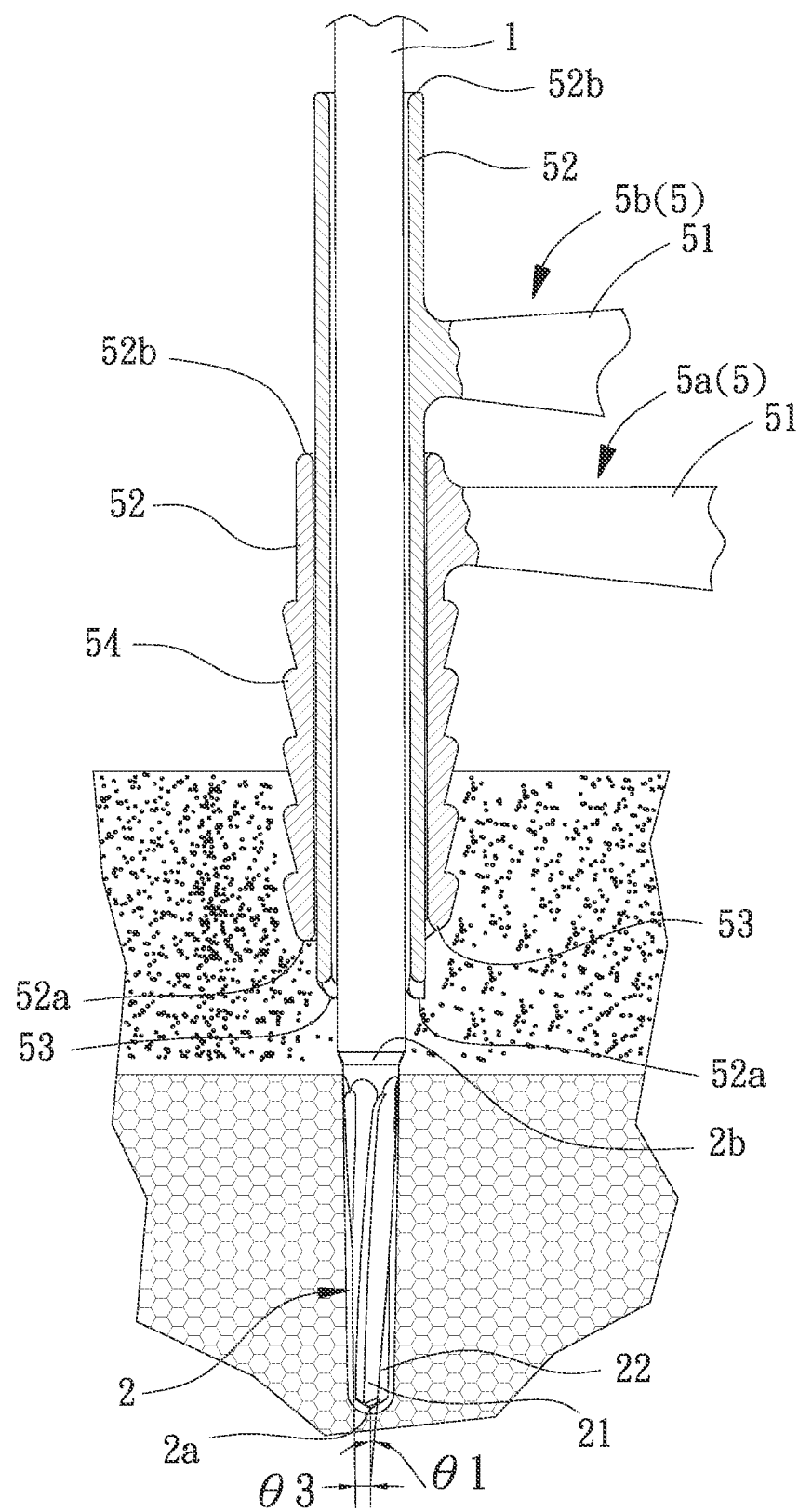
FIG. 10 is a diagrammatic cross sectional view of the surgical instrument of the fourth embodiment according to the present invention in use.

Please refer to FIG. 9 which is a perspective view of the surgical instrument of the fourth embodiment according to the present invention in use. When the worker requires to use a plurality of rods 1 and a plurality of push portions 2 of different outer diameters to proceed with staged reaming operation, they are used according to the increasing sequence of diameter to gradually ream the hole. In this embodiment, an example of two guiding members 5a, 5b is set forth. Firstly, the socket 52 of a smaller inner diameter of the guiding member 5b is placed into the socket 52 of a larger inner diameter, as shown in FIGS. 9 and 10. At this time, the rod 1 and the push portion 2 of a smaller outer diameter can be guided by the socket 52 of a smaller inner diameter to drill a hole. Then, the guiding member 5b having the socket 52 with a smaller inner diameter is removed (see FIG. 7). The other guiding member 5a remains in position while the rod 1 and the push portion 2 of a larger outer diameter can be guided by the socket 52 of a larger inner diameter to ream the hole, thereby completing the staged reaming operation.

In view of the foregoing, the surgical instrument according to the present invention includes a plurality of grooves 21 on the push portion 2. Each two adjacent grooves 21 having a rib 22 formed therebetween. The top face of the cross section of each rib 22 is the surface C of the push portion 2. Since the connection area between the guiding face 22a and the surface C forms an obtuse angle, the ribs 22 will not cut the inner wall of the bone. Furthermore, after the push portion 2 drills into the bone, the bone scraps generated while the blade drills into the bone enter the grooves 21 and can be guided to the top faces of the ribs 22 and can press against the inner wall of the bone, such that the bone scraps and the inner wall of the bone together form a dense layer, forming a tough bone. This can reduce bone loss, increase the stability of the bone mass, assist in post-surgery recovery, and increase the success rate of the operation on a patient suffering from osteonecrosis.

Although the present invention has been described with respect to the above preferred embodiments, these embodiment are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims. Furthermore, in a case that several of the above embodiments can be combined, the present invention include the implementation of any combination.

What is claimed is:

1. A surgical instrument comprising:
a rod including two ends and an axis passing through the two ends, wherein the axis is a rotating axis of the rod;
a push portion having a first end connected to one of the two ends of the rod, wherein the push portion includes a second end having a blade portion, wherein the push portion includes a plurality of grooves, wherein the plurality of grooves is recessed in a surface of the push portion, wherein the plurality of grooves is spaced from each other, wherein a rib is formed between a pair of adjacent grooves of the plurality of grooves, wherein a top face of a cross section of each rib is the surface of the push portion, wherein each rib has a guiding face on the cross section of the push portion, wherein the guiding face is connected to the surface of the push portion, wherein the guiding face faces a rotating direction, and wherein an angle between the guiding face and the surface of the push portion in the cross section is greater than 90°; and
two guiding members, wherein each guiding member includes a connecting stem and two sockets disposed at two ends of the connecting stem respectively, wherein the two sockets disposed at the two ends of the connecting stem have different inner diameters, and wherein an inner diameter of the sockets on one of the two guiding members corresponds to or is slightly greater than an outer diameter of one of the sockets of another of the two guiding members.

2. The surgical instrument as claimed in claim 1, wherein each of the plurality of grooves extends in a direction which is at an angle of 1°-45° to the axis.

3. The surgical instrument as claimed in claim 1, wherein the push portion has a diameter that gradually decreases from the first end towards the second end.

4. The surgical instrument as claimed in claim 3, wherein a tapered surface of the push portion is at an angle of 1°-16° to the axis.

5. The surgical instrument as claimed in claim 1, further comprising a limiting member coupled to an outer surface of the rod and axially slidable relative to the rod, wherein the limiting member includes a positioning portion configured to position the limiting member in a predetermined location on the rod.

6. The surgical instrument as claimed in claim 5, wherein the limiting member is an annular member, wherein the positioning portion includes a bolt and a screw hole, wherein the screw hole extends from an inner surface through an outer surface of the limiting member, and wherein the bolt engages with the screw hole and abuts the rod.

7. The surgical instrument as claimed in claim 1, further comprising a socket, wherein the socket includes an abutting end and an inseliion end, and wherein the rod and the push portion are configured to be inserted into the insertion end.

8. The surgical instrument as claimed in claim 7, wherein the abutting end includes an end edge having a plurality of abutting portions, and wherein the plurality of abutting portions is a plurality of protrusive teeth or a plurality of recessions.

9. The surgical instrument as claimed in claim 7, wherein the socket includes a disengagement prevention portion on an outer periphery thereof, and wherein the disengagement prevention poliion is a plurality of annular portions protruding in a radial direction.

10. The surgical instrument as claimed in claim 9, wherein the disengagement prevention portion includes a single-direction inclined surface.

11. The surgical instrument as claimed in claim 1, wherein the socket includes an abutting end and an insertion end, wherein the rod is configured to be inserted into the insertion end, wherein the abutting end includes an end edge having a plurality of abutting portions, and wherein the plurality of abutting portions is a plurality of protrusive teeth or a plurality of recessions.

12. The surgical instrument as claimed in claim 1, wherein the socket includes a disengagement prevention portion on an outer periphery thereof, and wherein the disengagement prevention portion is a plurality of annular portions prnlnlding in a radial direction.

13. The surgical instrument as claimed in claim 12, wherein the disengagement prevention portion includes a single-direction inclined surface.

* * * * *